United States Patent
Lennox et al.

(10) Patent No.: US 9,822,536 B2
(45) Date of Patent: Nov. 21, 2017

(54) ROOF AND WALL COVER SYSTEM

(75) Inventors: Matthew Lennox, Cronulla (AU); Rodney Burge, Miranda (AU); Adam Farrow, Miranda (AU)

(73) Assignee: Matthew Lennox, Cronulla (AU)

(*) Notice: Subject to any disclaimer, the term of this patent is extended or adjusted under 35 U.S.C. 154(b) by 65 days.

(21) Appl. No.: 12/995,966

(22) PCT Filed: Jun. 2, 2009

(86) PCT No.: PCT/AU2009/000685
§ 371 (c)(1),
(2), (4) Date: May 31, 2011

(87) PCT Pub. No.: WO2009/146487
PCT Pub. Date: Dec. 10, 2009

(65) Prior Publication Data
US 2012/0186722 A1    Jul. 26, 2012

(30) Foreign Application Priority Data

Jun. 2, 2008 (AU) ................................. 2008202416
Jul. 30, 2008 (AU) ................................. 2008203409
(Continued)

(51) Int. Cl.
*E04G 21/28* (2006.01)
*E04D 12/00* (2006.01)
(Continued)

(52) U.S. Cl.
CPC .......... *E04G 21/28* (2013.01); *E04D 12/002* (2013.01); *E04D 5/00* (2013.01); *E04D 5/06* (2013.01); *E04G 2021/248* (2013.01)

(58) Field of Classification Search
CPC .......... E04D 5/00–5/12; E04D 12/002; E04G 21/28; E04G 2021/248
See application file for complete search history.

(56) References Cited

U.S. PATENT DOCUMENTS

| 4,769,962 A | 9/1988 | Pohl |
| 4,818,588 A | 4/1989 | Okabe |

(Continued)

FOREIGN PATENT DOCUMENTS

| AU | 199466002 | 10/1994 |
| AU | 2008202416 | 9/2008 |

(Continued)

OTHER PUBLICATIONS

Written Opinion of the International Searching Authority, dated Oct. 8, 2010 by the Australian Patent Office, for International Application PCT/AU2010/001026.

(Continued)

*Primary Examiner* — Carson Gross
(74) *Attorney, Agent, or Firm* — Knobbe Martens Olson & Bear LLP

(57) ABSTRACT

A covering of a damaged or uncompleted building; the covering including a film of heat shrinkable material stretched over damaged or uncompleted portions of the building; the film formed as a sheet comprising an assembly of lengths of the heat shrinkable material applied to surfaces of the building.

12 Claims, 7 Drawing Sheets

(30) Foreign Application Priority Data

Oct. 30, 2008 (AU) ................................ 2008101060
Jan. 22, 2009 (AU) ................................ 2009200232

(51) Int. Cl.

| | |
|---|---|
| E04D 5/06 | (2006.01) |
| E04D 5/00 | (2006.01) |
| E04G 21/24 | (2006.01) |

(56) References Cited

U.S. PATENT DOCUMENTS

| | | | |
|---|---|---|---|
| 6,425,213 B1 * | 7/2002 | Lachapelle | ................ 52/169.14 |
| 6,632,496 B1 | 10/2003 | Johnson | |
| 6,797,218 B1 | 9/2004 | Bickerstaff | |
| 2005/0217202 A1 * | 10/2005 | Crook | ........................ 52/782.1 |
| 2008/0022620 A1 | 1/2008 | Crowley | |
| 2008/0060302 A1 * | 3/2008 | Bletsos et al. | ................ 52/408 |

FOREIGN PATENT DOCUMENTS

| | | |
|---|---|---|
| EP | 0410275 | 1/1991 |
| GB | 2376206 | 12/2002 |
| GB | 2388815 | 11/2003 |

OTHER PUBLICATIONS

English language translation of the Abstract of European Patent Application No. 0410275.

International Search Report of the International Searching Authority, dated Oct. 8, 2010 by the Australian Patent Office, for International Application PCT/AU2010/001026.

International Search Report of the International Searching Authority, dated Jul. 20, 2009 by the Australian Patent Office, for International Application PCT/AU2009/000685.

* cited by examiner

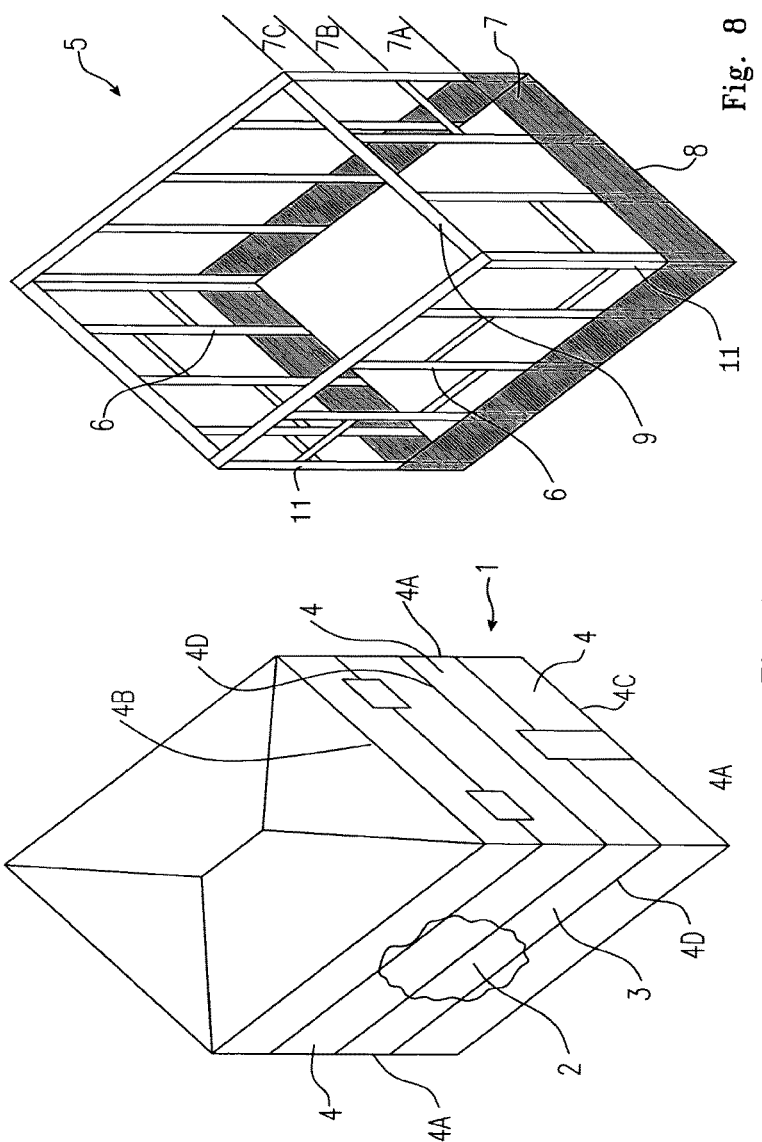

ROOF AND WALL COVER SYSTEM

CROSS REFERENCE TO RELATED APPLICATIONS

This application is a §371 national phase entry of International Application No. PCT/AU2009/000685, filed Jun. 2, 2009, which claims priority to Australian Patent Application No. 2008202416, filed Jun. 2, 2008, Australian Patent Application No. 2008203409, filed Jul. 30, 2008, Australian Patent Application No. 2008101060, filed Oct. 30, 2008, and Australian Patent Application No. 2009200232, filed Jan. 22, 2009, the entire contents of which are incorporated herein by reference.

The present invention relates to protective covering of roofs and walls of a building and, more particularly, to the covering of damaged or under construction roofs, as well as the covering of walls of buildings.

BACKGROUND

Roofs, as well as walls, are susceptible to damage from high winds, rain or hail. Tiled roofs for example may have a considerable area of tiles either damaged from hail impact, or dislodged completely as the result of high intensity storms. Shingled roofs are liable to be similarly damaged, and even metal sheeted roofs may suffer partial or total removal of one or more sheets. Damage to roofs and walls may also be caused by the impact of falling trees, large branches, or other objects made airborne under high wind conditions.

Storm or impact damage cannot usually be immediately repaired so that to prevent further or potential damage to the interior of the building, temporary covering must be provided. Typically canvas (or similar material) tarpaulins are placed over the damaged part of the roof and secured to the structure by ropes.

One disadvantage of this method of temporary covering is the difficulty of adequately securing a tarpaulin to the roof or walls so that they remain very vulnerable to dislodgement should high winds prevail or recur and often require continuing attention and adjustment. Moreover, they are heavy and awkward to position, posing occupational health and safety issues. A further disadvantage is that they are expensive to acquire and bulky to store, and if the many roofs are damaged in one storm event, the number of tarpaulins available may be inadequate.

Buildings under construction, particularly timber framed, brick clad dwellings, are frequently constructed in a sequence where the timber frame, including that of the roof, is completed a considerable time before the roof cladding can be added. A disadvantage of this construction technique is that during this period the timber of the structure, which may even include timber or particle board flooring, is liable to deterioration from water and sun. A further disadvantage of this sequence of construction is that, if rain intervenes at the time further internal work is scheduled, the lack of roof covering may cause considerable delay and financial loss.

A system of covering a roof with a film of material for the purpose of preventing damage from wind shear was disclosed in US 2005/0217202. However this US application teaches a method of application of the film from a roll of film hoisted up onto the roof surface, the film being unrolled in situ with overlapping edges of the film being secured by the application of adhesive tape. Rolls of film are heavy and in practice the manipulation of a roll of film and the edge taping required on even an intact roof surface is extremely difficult, if not dangerous and is completely impractical for application to the roof framing of an uncompleted building.

It is common practice to provide a moisture resistant barrier or wrap to a building structure. Such barriers or building wraps are particularly important for those structures that are constructed of timber framing. It is known to apply a weather resistant wrap over the timber studs of a building in order to resist the ingress of moisture. This moisture can cause unwanted structural movement in framework constructed from kiln dried timber.

The material is typically in the form of a flexible plastic film such as polyethylene. Prior art practice for applying building wrap comprises unrolling, measuring and cutting strips of wrap on the ground and then subsequently joining them to form a single sheet for subsequent nailing or stapling across the vertical walls or stud frame of a structure. Because of the slippery nature of the wrap material and difficulties in managing said wrap in windy conditions it is often extremely awkward or even dangerous to work at elevated locations. Also areas of slack or looseness can arise when the preformed sheet is nailed or stapled to the structure. This results in air pockets which may detract from the insulating and sealing properties of the wrap.

Older buildings frequently included asbestos material for roofing, wall cladding and pipe lagging. Removal of such material, for example during renovations, repair or for health risk reasons, provides hazards from loose asbestos flakes and fibres escaping into the environment.

It is an object of the present invention to address or at least ameliorate some of the above disadvantages.

Notes

1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a roof cover system for damaged or uncompleted roofs; said cover system including a film of heat shrinkable material stretched over a said damaged or uncompleted roof; said film formed as a sheet comprising an assembly of lengths of said heat shrinkable material prepared on a ground surface; said sheet positioned on said roof and brought into conformity with surfaces of said roof through application of heat.

Preferably, said heat shrinkable film provides a temporary waterproofing of a damaged roof.

Preferably, said heat shrinkable film provides a temporary waterproofing of an unclad roof of a building under construction.

Preferably, said heat shrinkable film is provided with a heat reflecting surface.

Preferably, said heat shrinkable film forms a permanent heat reflecting layer.

Preferably, said heat shrinkable film is retained by mechanical means at edges of a said damaged or uncompleted roof.

Preferably, said mechanical means include a temporary batten affixed under eaves of said roof.

Preferably, said heat shrinkable film has a thickness of between 0.6 and 0.7 mm.

Preferably, said heat shrinkable film is a film of low-density polyethylene.

Preferably, said heat shrinkable film includes shrinking resins, UV inhibitors, anti-brittling compounds and strengtheners.

In another broad form of the invention, there is provided a method of protecting a roof structure from water ingress; said method including the steps of:
(a) selecting a roll of heat shrinkable film of suitable width,
(b) cutting a required number of lengths of said film from said roll; said lengths sufficient to extend from one edge of said roof structure to an opposite edge, and sufficient to cover at least a portion of said roof,
(c) assembling at least two lengths of said heat shrinkable film laid out along a ground surface into a sheet of material,
(d) attaching a trailing end of said sheet at an edge of said roof structure,
(e) taking a leading edge of said sheet to said opposite edge,
(f) attaching said leading edge of said sheet at said opposite edge,
(g) applying heat with a heat gun to said sheet of heat shrinkable film.

Preferably, said roof structure comprises an existing roof damaged through wind shear or impact.

Preferably, said roof structure comprises unclad roof framing of a building under construction.

Preferably, said heat shrinkable film is provided with a heat reflecting surface; said heat shrinkable film forming a heat reflective layer under roof cladding.

Preferably, said trailing edge and said leading edge of said sheet are attached by means of a batten affixed under outer ends of rafters of said roof structure.

Preferably, said trailing edge and said leading edge of said sheet are attached by means of a batten affixed under eaves of said roof structure; portions of each said trailing edge said leading edge wrapped around a said batten.

Preferably, said method further includes the step of:
(a) securing an outer edge of a side of said sheet of heat shrinkable film to an edge of said roof structure where said side adjoins a said edge of said roof structure.

In another broad form of the invention, there is provided a vented roof cover system for damaged or uncompleted roofs; said cover system including a film of heat shrinkable material stretched over a said damaged or uncompleted roof; said film formed as a sheet comprising an assembly of lengths of said heat shrinkable material prepared on a ground surface; said sheet prepared with at least one vent element so as to allow communication between volumes of air within a roof space under said sheet and air above said sheet.

Preferably, said vent comprises a base portion and a flexible flap adapted to cover an aperture in said base portion so as to prevent ingress of rain water.

Preferably, said base portion is proved with an adhesive layer; said adhesive layer exposed by removal of a peel-off protective cover layer; said vent affixed over an aperture prepared in said sheet.

Preferably, said sheet is positioned on said roof and brought into conformity with surfaces of said roof through application of heat.

Preferably, said heat shrinkable film provides a temporary waterproofing of a damaged roof.

Preferably, said heat shrinkable film provides a temporary waterproofing of an unclad roof of a building under construction.

Preferably, said heat shrinkable film is provided with a heat reflecting surface.

Preferably, said heat shrinkable film forms a permanent heat reflecting layer.

Preferably, said heat shrinkable film is retained by mechanical means at edges of a said damaged or uncompleted roof.

Preferably, said mechanical means include a temporary batten affixed under eaves of said roof.

Preferably, said heat shrinkable film has a thickness of between 0.6 and 0.7 mm.

Preferably, said heat shrinkable film is a film of low-density polyethylene.

Preferably, said heat shrinkable film includes shrinking resins, UV inhibitors, anti-brittling compounds and strengtheners.

In still another broad form of the invention, there is provided a method of preparing a sheet of heat shrinkable material for protecting a roof structure from water ingress; said method including the steps of:
(a) selecting a roll of heat shrinkable film of suitable width,
(b) cutting a required number of lengths of said film from said roll; said lengths sufficient to extend from one edge of said roof structure to an opposite edge, and sufficient to cover at least a portion of said roof,
(c) assembling at least two lengths of said heat shrinkable film laid out along a ground surface into a sheet of material,
(d) cutting at least one aperture into said sheet of material,
(e) affixing a vent over said aperture so as to allow communication between air volumes above and below said sheet of material.

Preferably, said method includes the further steps of:
(a) attaching a trailing end of said sheet at an edge of said roof structure,
(b) taking a leading edge of said sheet to said opposite edge,
(c) attaching said leading edge of said sheet at said opposite edge,
(d) applying heat with a heat gun to said sheet of heat shrinkable film.

Preferably, said roof structure comprises an existing roof damaged through wind shear or impact.

Preferably, said roof structure comprises unclad roof framing of a building under construction.

Preferably, said heat shrinkable film is provided with a heat reflecting surface; said heat shrinkable film forming a heat reflective layer under roof cladding.

Preferably, said trailing edge and said leading edge of said sheet are attached by means of a batten affixed under outer ends of rafters of said roof structure.

Preferably, said trailing edge and said leading edge of said sheet are attached by means of a batten affixed under eaves of said roof structure; portions of each said trailing edge said leading edge wrapped around a said batten.

Preferably, said method further includes the step of:
(a) securing an outer edge of a side of said sheet of heat shrinkable film to an edge of said roof structure where said side adjoins a said edge of said roof structure.

In still another broad form of the invention, there is provided a method of applying a moisture proof building wrap to a structure is disclosed, said method including the steps of:

procuring a roll of building wrap in the form of a heat shrinkable plastic film, attaching a free edge of said film to an inside perimeter edge of said structure and disposing an opposite leading edge of said film horizontally across to an opposite side of said structure one or more times to form one or more horizontal bands of said film for fixing thereto, and applying heat to said bands to shrink the film tight against said structure.

Preferably a plurality of horizontal bands of film are applied in overlapping fashion to entirely cover said structure.

Preferably, the joints between said horizontal bands are sealed with tape.

Preferably, said heat is applied to the corner perimeters and top and bottom plate areas to shrink the film into sealing engagement with said structure.

Preferably, said bands are overlapped by about 300 mm.

Preferably, the film is then cut as required to accommodate wall penetrations such as windows and doors.

It is further preferred to cut around said wall penetrations allowing a minimum of 300 mm rise therearound and to subsequently apply additional heat to ensure film shrinkage back for a moisture tight seal against said structure.

It is further preferred to use a 150 mm low density polyethylene film which contains fife retardant, reflective film, shrinking resins, UV inhibitors, anti-brittling compounds and strengtheners. One film that ~a currently used is known under the brand name "Buildseal" and produced by Optimum Metallising Pity Ltd of Kings Park NSW.

BRIEF DESCRIPTION OF DRAWINGS

Embodiments of the present invention will now be described with reference to the accompanying drawings wherein:

FIG. 7 shows a schematic perspective view of an impact or storm damaged wall of a building, and FIG. 8 shows a schematic perspective view of a timber stud structure undergoing construction or renovation.

DETAILED DESCRIPTION OF PREFERRED EMBODIMENTS

The roof cover system of the present invention provides for a system and method for covering a damaged or uncompleted roof of a building. The system uses a heat shrinkable film, preferably a low-density polyethylene containing shrinking resins, UV inhibitors, anti brittling compounds and strengtheners for tear resistance. The film is preferably between 0.6 and 0.7 mm in thickness and is provided in rolls of various widths and lengths. In at least one preferred form of the film, it is provided with a heat reflective surface.

First Preferred Embodiment

Figure 1:
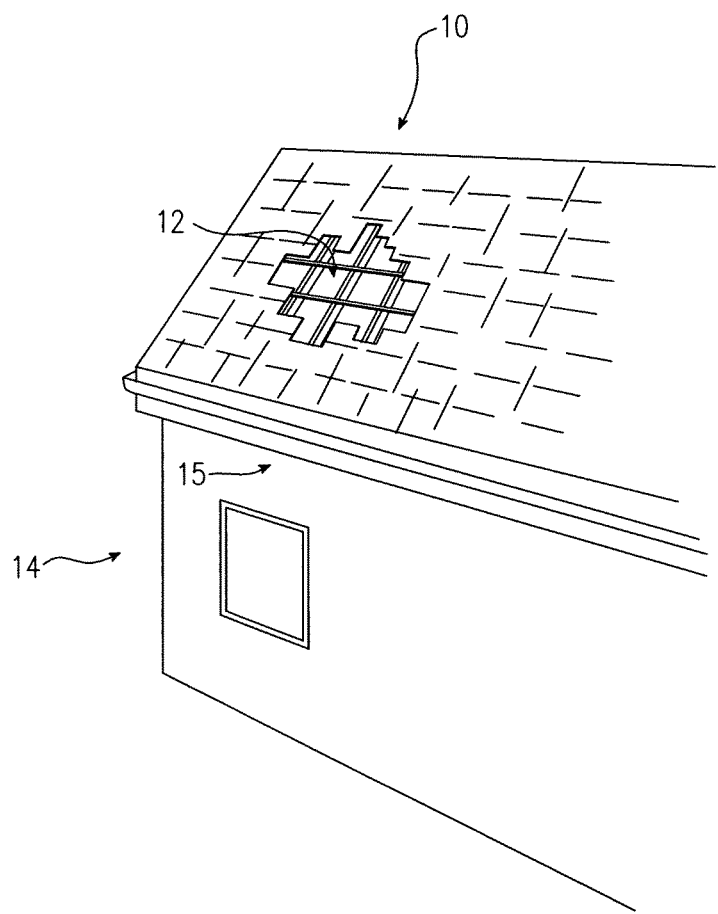
FIG. 1 is a perspective view of a portion of a building of which the roof has sustained damage.

With reference to FIG. 1, typical damage to a tiled roof 10 of a building 14 may include the loss of a number of tiles due to a high wind shear event, leaving the building 14 open to the ingress of water. Water ingress may also occur if the tiles are cracked for example from heavy hail impact or falling trees or branches. Emergency temporary repair is provided by the roof cover system of the invention by applying the above described film over that portion of the roof which has sustained damage.

If required, sharp edges protruding from the roof surface may first be covered with suitable wadding and adhesive tape to prevent possible tearing of the film during application.

Figure 2:
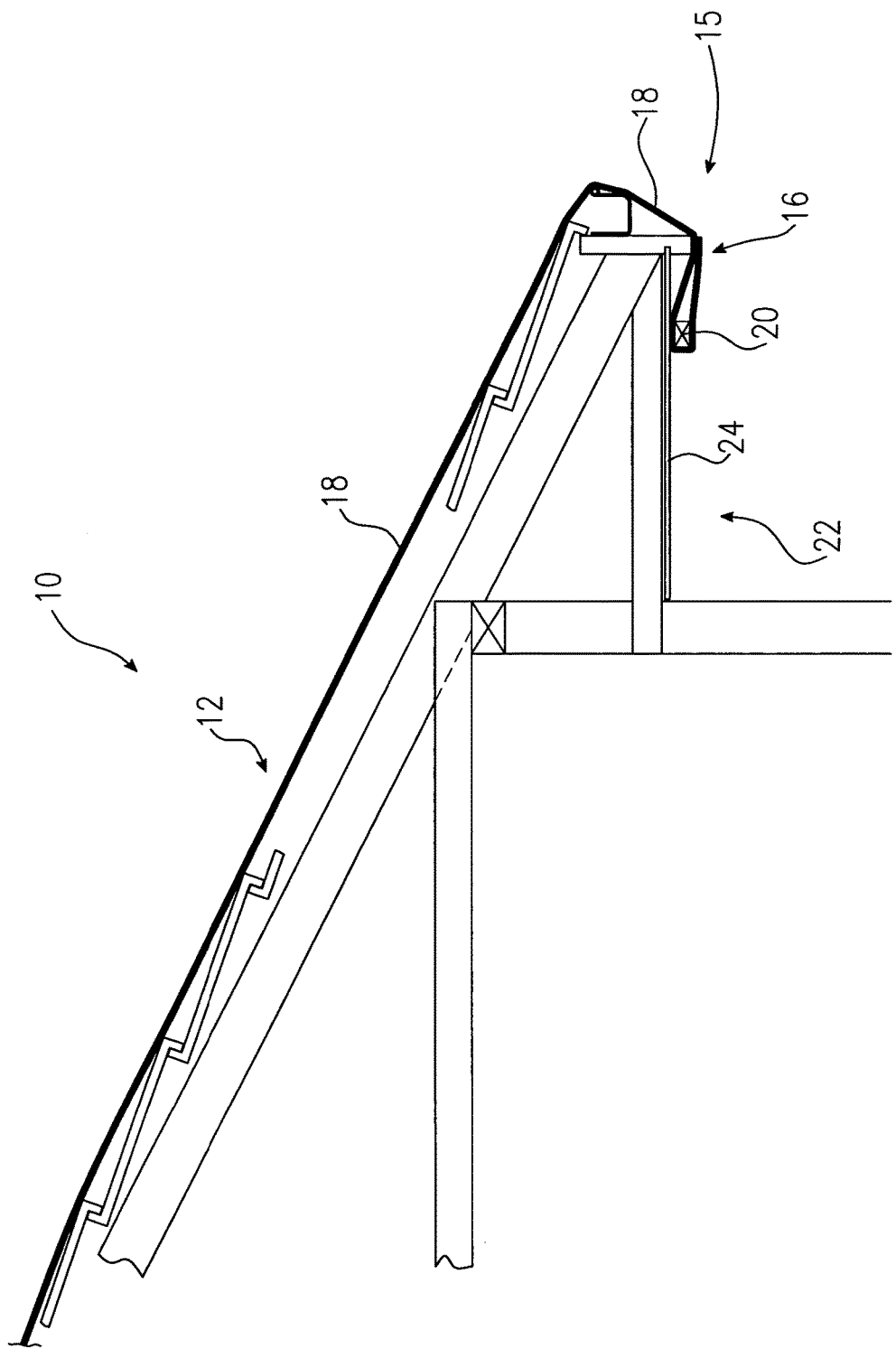
FIG. 2 is a side sectioned view of a portion of a building and existing roof structure to which has been applied a roof cover system according to the invention.

The extend of roof to be covered is measured and the most suitable available width roll of the heat shrinkable film selected. Film is cut to one or more lengths sufficient to extend from one edge of the roof to an opposite edge. With reference to FIG. 2, a trailing edge of a length of film is mechanically attached to the first edge 16 of the roof 10. In one preferred method as shown in FIG. 2, the trailing edge 15 of the film 18 is wrapped once around a length of batten 20 preferably as long as the width of the film, and the batten 20 mechanically fixed to the underside 22 of the eaves 24 at the first edge of the roof.

The leading edge is now passed over the roof to the opposite edge (not shown) of the roof and the leading edge secured to the opposite side eaves in similar manner to that already described. If the outer side edge of the length of film adjoins an edge of the roof, this may be similarly secured under the eaves along that side of the roof. Alternatively, the leading edge may be secured to the barge or fascia boards.

Heat is now applied to the film at the underside of the eaves 24 with a heat gun (not shown) to cause the film 18 to shrink securely around the batten and the undersides of the eaves. The heat gun, now attached to an extension arm (not shown), is then used to apply heat to the entire length of film 18 stretched over the roof surface, causing it to tightly conform to the surface and covering missing or cracked tiles 12.

If the extent of the damage requires, successive lengths of film can be applied side by side with an overlap of preferably 300 mm. Heat is applied along these overlaps to seal the edges of the adjoining lengths together.

Valley areas and other discontinuities in the roof surface can be accommodated by cutting film to suit the are involve and heat sealing to adjoining film length edges. Vertical roof penetrations, such as chimney stacks ventilators and the like, are sealed by preferably a 300 mm rise of film. Edges of riser sections of film can be taped or cable-tied to the penetration.

By the above means, a damaged roof can be rapidly and securely covered to prevent water ingress and damage to the inside of the building. Unlike tarpaulins which are difficult to secure an remain liable to dislodgement in high winds, the heat shrinkable film by conforming closely to the roof surface, provides a secure seal over the damage until permanent repairs can be made.

Second Preferred Embodiment

In a second preferred embodiment of the invention, a damaged section of a roof to be temporarily protected prior to permanent repair, is again covered by a heat shrinkable film. In this embodiment however, the method of application is different.

Figure 5:
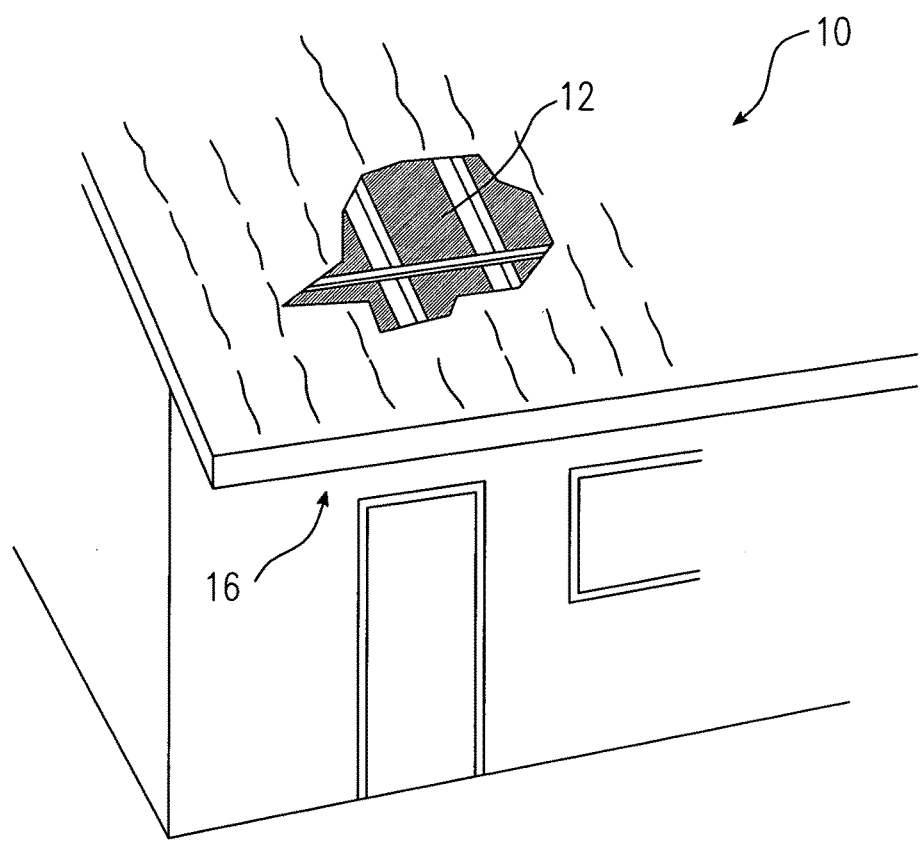
FIG. 5 is an illustration of the preparation of a sheet of heat shrinkable material prepared on a ground surface as an assembly of lengths of material taken from a roll of film.
Figure 5:
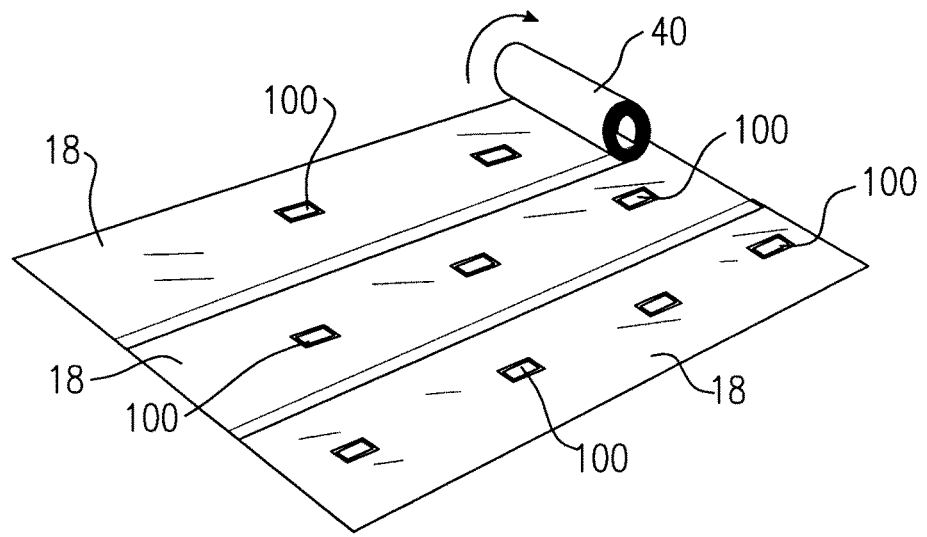

Instead of attempting to apply individual lengths of film, attaching a length at a first end to the eaves at one side of the roof, stretching the length over the roof to be attached at the eaves at the opposite side, and taping the edges of adjoining lengths of film together, the method of this embodiment, with reference to FIG. 5 is as follows:

(a) the location of the damaged section 12 of roof 10 is assessed in relation to the nearest opposing edges of the roof,
(b) the length of film required to extend between the opposing roof edges is estimated, allowing for overhang and fixing requirements,
(c) the width of the damaged area is ascertained and the number of lengths of the available film required to cover and overlap the damaged area determined,
(d) the number of lengths of material 18 is then cut from a roll 40 of the film and laid out side by side on the ground,
(e) while on the ground, adjoining edges of the lengths of film are taped to form a waterproof assembled sheet of heat shrinkable film, sufficient to stretch from one roof edge to the opposite roof edges and of sufficient width to cover the damaged area.

This assembled sheet is now pulled up onto the roof, positioned so as to cover the damaged area and outer ends fastened in similar manner as previously described above.

An advantage of this method is that there is no need to lift a relatively heavy roll of heat shrinkable material onto the roof and unroll it one what may be quite steep surfaces. Moreover it has been found in practice that the arrangement described in the first preferred embodiment above of taping the edges of adjoining lengths of the material together on the roof is both difficult and dangerous. This is especially so if the damage to the roof is extensive and perhaps been rendered structurally unsafe. The method of the present described embodiment minimises activity on the roof surface, requiring only that one edge of the sheet of material be carried over the roof from a first edge to an opposite edge.

Third Preferred Embodiment

Figure 3:
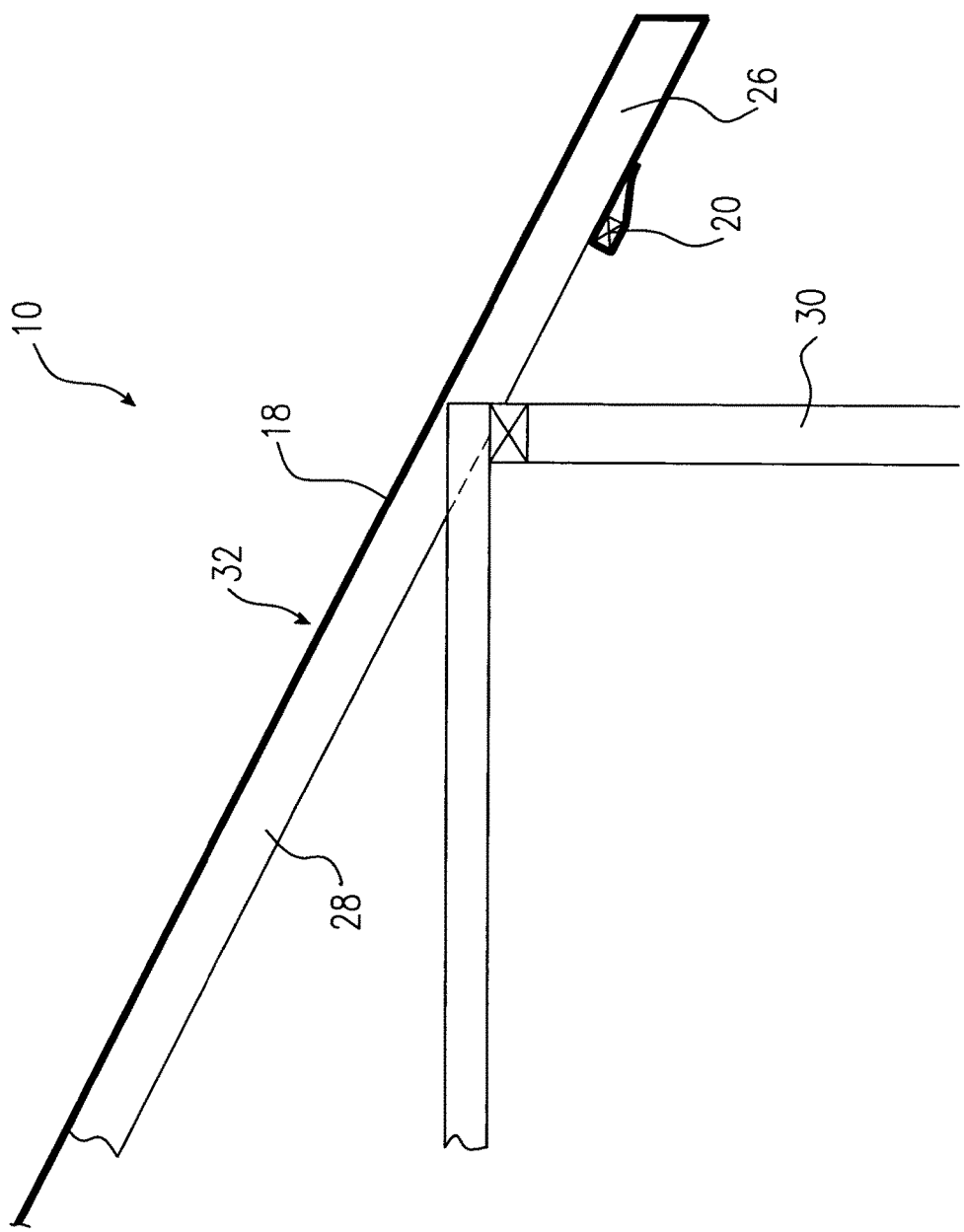
FIG. 3 is a side sectioned view of a portion of a partly completed building showing the application of a roof cover system of the invention to unclad roof framing.

In a third preferred embodiment of the invention, a heat shrinkable film may be applied to the roof framing of an uncompleted building. In this embodiment as shown in FIG. 3, the heat shrinkable film 18 is applied after the roof framing is complete but preferably prior to the attachment of facia boards.

In this embodiment also, lengths of film are prepared from suitable width rolls sufficient to stretch from one side of the roof to an opposite side. In this case the trailing and leading edges of the length of film are preferably attached by means of battens 20 fixed to the underside of the outer ends 26 of rafters 28, that is between the outer ends of the rafters 28 and the wall frame 30.

Figure 4:
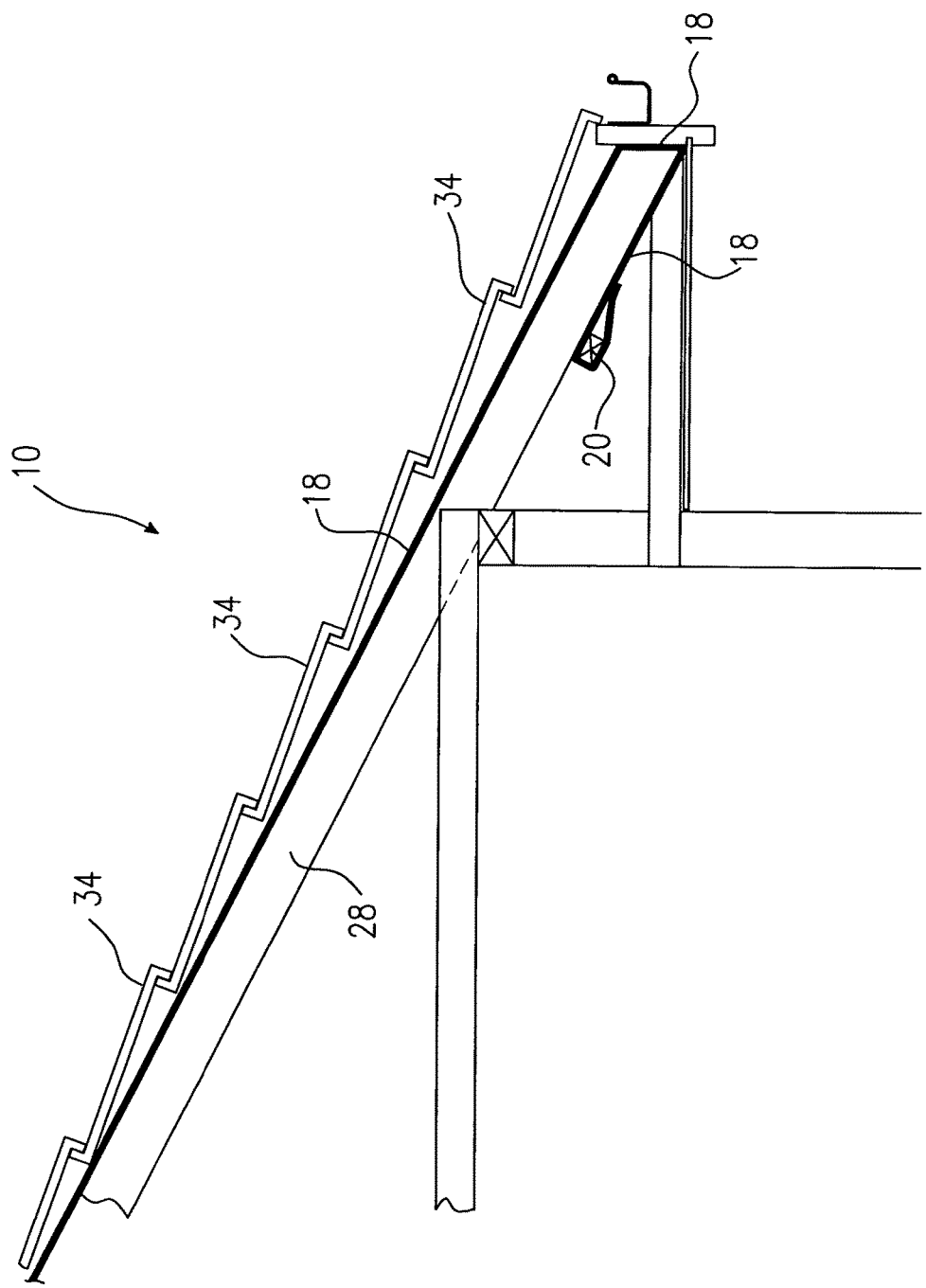
FIG. 4 is a further side sectioned view of the building of FIG. 3 showing the roof cover system of the invention functioning as a permanent sarking layer.

The heat shrinkable film 18 in this embodiment, is provided with a heat reflecting upper surface 32 so that the film 18 forms a permanent sarking layer beneath the roofing cladding, either tiles 34, as shown in FIG. 4, or metal sheeting. Thus in this embodiment the heat shrinkable film of the invention act both to protect the timberwork of a building under construction and provides a replacement for conventional reflective sarking.

The weatherproof nature of the heat shrinkable material applied in this way provides for internal work on the building to continue in the event of inclement weather, thus increasing productivity and economy of construction.

It will be understood that the method of application described in the second preferred embodiment above is also, indeed perhaps even more so, applicable to the present embodiment. In this case manipulating a roll of material and taping edges of lengths of material together over the open framework of the roof of a building under construction is even more difficult so that assembly on the ground, perhaps into a number of sheets, prior to placement over the roof framing, is clearly advantageous.

Figure 6:
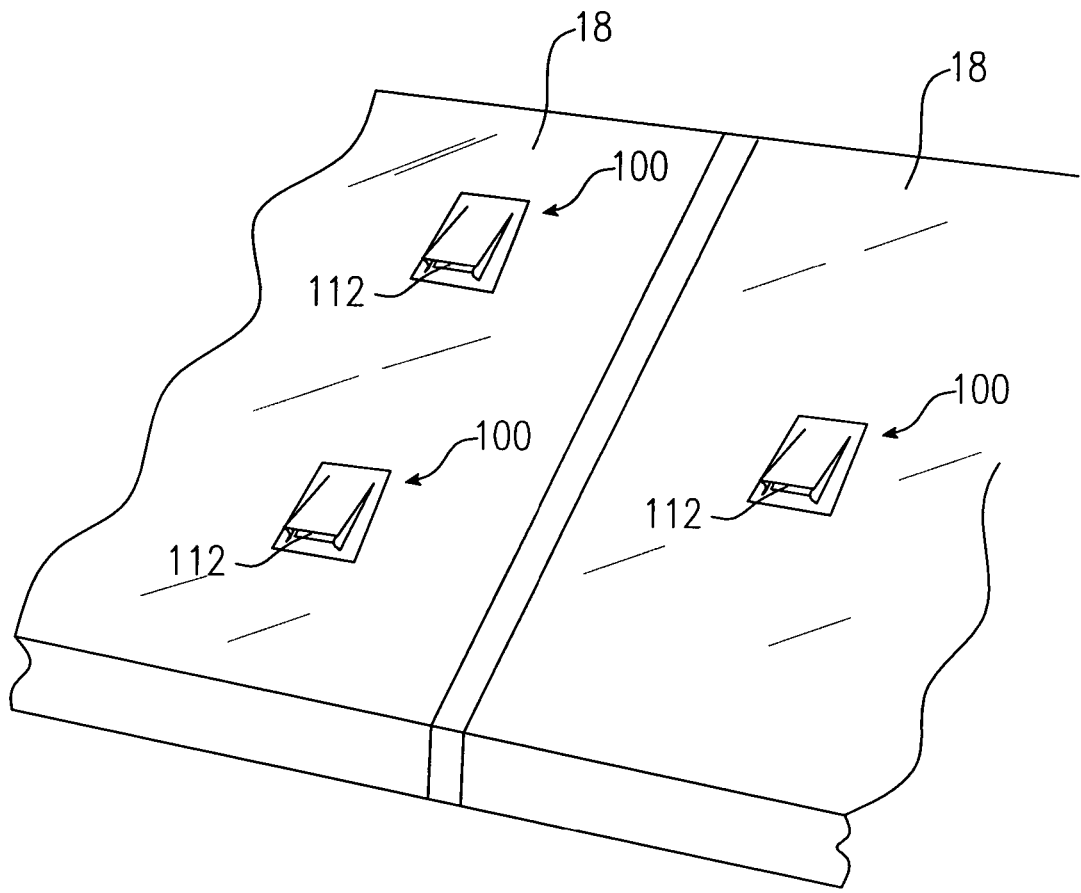
FIG. 6 is a perspective view of a portion of heat shrinkable material in position over a section of roof in which the sheets of material were prior prepared with air vents.
Figure 6A:
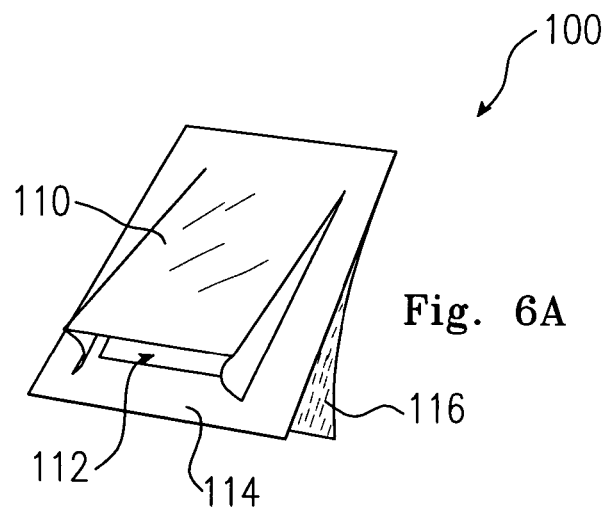
FIG. 6a is a perspective view of one preferred embodiment of the air vents of FIG. 6.

In each of the above described embodiments, the sheet of material may be further prepared, as shown in FIG. 6, by adding a distribution of air vents 100 at various locations in each of the strips 18. Preferably, the vents 100, as shown in FIGS. 6 and 6A, take the form of one-way covers or flaps 110 which are affixed over an aperture 112 cut into the strips of film 18 at the desired location. The flaps 110 are so arranged as to prevent the ingress of rainwater while allowing the passage of air.

In one preferred form the vent 100 is pre-formed of low density polyethylene and provided with a self adhesive base 114. To apply the vent 100 after the aperture has been prepared, a protective cover 116 is peeled off the adhesive layer of base 114 and the vent 100 pressed into position.

These vents allow the exhalation of air from underneath the sheet of material, either as a result of higher air pressure arising within the roof space, for example through rising warm air or through the ingress of wind, or due to negative pressure above the sheet material.

Fourth Preferred Embodiment

Referring first to FIG. 7 there is a cladded structure indicated generally as 1 with an area 2 of impact or storm damage in side wall 3. In accordance with the invention the structure is wrapped as defined above with horizontal bands 4 of a heat shrinkable polyethylene film. The bands preferably overlap by about 300 mm and are heated at the corner perimeters 4A and top and bottom plate areas 4D and 4C preferably using a hand held LPG heat gun or the like. The film then shrinks and seals tight against the building and also against itself along the overlapping joints 4D to exclude weather and moisture. Although not shown in the drawings a substructure batten type frame with diagonal bracing is preferably built over the damaged area 2 before the film is applied.

With the timer stud structure 5 of FIG. 8 the building wrap is applied directly over the studs 6 in horizontal bands 190 mm wide in a similar fashion to FIG. 1. While only the lower band 7 is shown adjacent the bottom plate 8 subsequent bands are applied as described earlier in overlapping fashion up to the top late 9. Heat is then applied to the perimeter corners 11 and top and bottom plate areas to shrink the film to seal against itself along taped overlapping joints and also against the structure.

Preferably the film is provided with an outer reflective surface so as to also provide thermal insulation and a cost effective replacement for conventional wall sarking and insulation.

With both structures as mentioned earlier the film is cut after wrapping to accommodate doors, windows and other penetrations.

Other uses, benefits and advantages will become apparent from the following summary and preferred methodology for the invention.

Currently Preferred Methodology
  Select the correct width roll as it is important to have the least amount of welds in the sealing process.
  Site measure the area which to be sealed.
  Ensure any sharp object are padded.
  Attach one side of the shrink wrap to the inside edge of perimeter stud work. Securely fix by a continuous batten.
  Take the leading edge of the said film across to the Opposite the structure.
  Securely fix off the opposite side by continuous batten.
  Apply heat to the film wrapped stud in a continuous even pattern with a similar motion of a spray paint gun.
  Allow time for the film to shrink on to itself.
  Repeat this process to all vertical wall surfaces.
  Now using the heat gun extension tool apply an even continuous heat to the entirety of the vertical wall surface allowing enough passes for the shrink wrap to contract.
  Continue this process with overlapped joints of 300 mm until the structure is covered entirely.
  For wall penetrations such as windows and doors cut the plastic as required.
  Allow to cut around alt wail penetrations allowing a minimum of 300 mm rise around all penetrations. Apply heat to ensure the film shrinks back onto the sub structure allowing a watertight seal.
  Ensure all edges are sealed.
  Continuously check for burn holes and patch as required.
  For vertical impact damaged areas a sub structure frame will be required for the shrink wrap to be applied over. This is a simple batten type frame with diagonal bracing securely fixed to the structure.
Uses
  Wall insulation and draught elimination.
  Asbestos removal and disposal.
  All weather protection during construction to eliminate lost time.
  Cost effective weather seal for storm Impact damaged buildings and or structures on vertical surfaces.
  Replacement/substitution for Vertical tarpaulins installations.
  Vertical timber framework protection during construction.
Benefits
  Cost effective replacement for wall sarking/insulation. Reflective surface provides excellent thermal qualities.
  Provides excellent thermal insulation on walls.
  Ensures kiln dried structural framework is not exposed to weather conditions eliminating structural movement.
  Provides a dust free environment when removing asbestos.
  Reduces residual cost and time during re construction of storm Impact damaged buildings and or structures.
  Eliminates inclement weather days after main structure is in place therefore assisting productivity.
  No ongoing hire cost as is for tarpaulins.
  Eliminates the need to re attend sites to secure tarpaulins during the reconstruction process.

The above describes only some embodiments of the present invention and modifications, obvious to those skilled in the art, can be made thereto without departing from the scope of the present invention.

The invention claimed is:

1. A method of covering an opening in a roof structure to protect from water ingress, said method comprising the steps of: (a) selecting a roll of heat shrinkable film; (b) cutting a required number of lengths of said film from said roll; said lengths being sufficient to extend from an edge of said opening to an opposite edge of said opening; (c) assembling said lengths of heat shrinkable film into a sheet of material; (d) positioning said sheet of material over said opening; (e) affixing said sheet by mechanical means; and (f) applying heat to said sheet so as to produce heat shrinkage and, wherein said heat shrinkable film forms a permanent sarking layer beneath roof cladding.

2. The method of claim 1 wherein said method comprises the further steps of: (a) cutting at least one aperture into said sheet of material, (b) affixing a vent over said aperture so as to allow communication between air volumes above and below said sheet of material.

3. The method of claim 1 wherein said method comprises the further steps of: (a) attaching a trailing end of said sheet at an edge of said roof structure, (b) taking a leading edge of said sheet to said opposite edge, (c) attaching said leading edge of said sheet at said opposite edge, (d) applying heat with a heat gun to said sheet of heat shrinkable film.

4. The method of claim 1 wherein said roof structure comprises an existing roof damaged through wind shear or impact.

5. The method of claim 1 wherein said roof structure comprises unclad roof framing of a building under construction.

6. The method of claim 5 wherein said heat shrinkable film is provided with a heat reflecting surface; said heat shrinkable film forming a heat reflective layer under roof cladding.

7. A method of protecting a roof structure from water ingress; said method comprising the steps of: (a) selecting a roll of heat shrinkable film of suitable width, (b) cutting a length of said film from said roll sufficient to extend from one edge of said roof structure to an opposite edge, (c) attaching a trailing end of said length at an edge of said roof structure, (d) taking a leading edge of said length to said opposite edge, (e) attaching said leading end of said length at said opposite edge, (f) applying heat to said length of heat shrinkable film so as to produce heat shrinkage and, wherein said heat shrinkable film forms a permanent sarking layer beneath roof cladding.

8. A method of applying a moisture proof building wrap to a structure; said method comprising the steps of: (a) providing a roll of heat shrinkable plastic film, (b) attaching a free edge of said film to an inside perimeter edge of said structure and disposing an opposite leading edge of said film horizontally across to an opposite side of said structure one or more times to form one or more horizontal bands of said film for fixing thereto, (c) applying heat to said bands to shrink said film tight against said structure and, wherein said heat shrinkable film forms a permanent sarking layer beneath wall cladding.

9. The method as claimed in claim 8 and comprising the further step of cutting the film to accommodate doors, windows and other penetrations.

10. The method as claimed in claim 8 wherein a plurality of bands of said film with taped overlapping joints are formed on said structure.

11. The method as claimed in claim 8 wherein said heat is applied to the perimeter corners and top and bottom plate areas of said structure.

12. The method as claimed in claim 8 wherein said building wrap is a heat shrinkable polyethylene film.

* * * * *